June 12, 1923.
P. J. GARVIN
PLUMBING SYSTEM
Filed Oct. 3, 1921
1,458,818
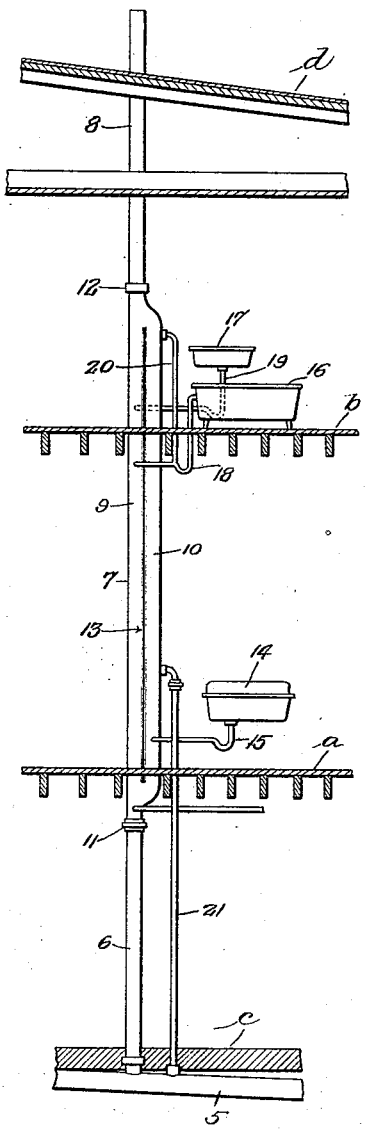
P. J. Garvin, INVENTOR.
BY Geo. P. Kimmel, ATTORNEY.

Patented June 12, 1923.

1,458,818

UNITED STATES PATENT OFFICE.

PETER J. GARVIN, OF NEW YORK, N. Y.

PLUMBING SYSTEM.

Application filed October 3, 1921. Serial No. 504,917.

*To all whom it may concern:*

Be it known that I, PETER J. GARVIN, a citizen of the United States, residing at New York city, in the county of New York and State of New York, have invented certain new and useful Improvements in Plumbing Systems, of which the following is a specification.

This invention appertains to a plumbing system and has for its principal object to minimize and simplify the construction and arrangement of the soil and vent pipes thereof, and to otherwise lessen the cost of manufacture of the fittings of the system, and of the labor for the installation thereof, as well as to greatly reduce the time required for such installation.

Another object of the invention is to provide for an improved plumbing system as characterized, and one of a construction and arrangement admitting of a more free ventage of the odors from the soil and waste passing through the same as well as through the sewer system as a whole to which the plumbing system is, together with other of such plumbing systems, connected.

With the foregoing and other objects in view, the invention resides in the certain novel and useful construction and arrangement of parts as will be hereinafter more fully described, set forth in the appended claim, and illustrated in the accompanying drawing, in which:—

The figure is a fragmentary sectional view through a building with a preferred embodiment of the plumbing system installed therein.

Referring to the drawing, the plumbing system has been shown as installed in a two story building or house, the first and second floors of which are indicated by the letters *a* and *b*, the basement or cellar floor by the letter *c*, and the roof portion of the building or house by the letter *d*. Disposed beneath the basement or cellar floor *c* is the usual sewer pipe section 5 to which is connected a lower vertical soil pipe section 6 having its upper end terminating immediately below the first floor *a* and connecting the lower end of a combined soil and vent pipe fitting or section, designated generally as at 7, and which constitutes the salient feature of the present invention. This combined soil and vent pipe fitting or section 7 extends upwardly through the first and second floors *a* and *b* to a point at a distance above the latter floor *b*, where it connects to a single vent pipe section 8 disposed in alignment with one leg of the fitting 7 and with the lower soil pipe section 6. The sections 6, 7 and 8 provide a combined soil and vent pipe element.

The combined soil and vent pipe fitting or section 7 is preferably made up of a single casting formed to provide a main straight soil pipe section or leg portion 9 and an auxiliary combined soil and vent pipe section or leg portion 10 which extends in close parallel relation to the section or portion 9 and connects the same at points slightly inward from the lower and upper ends thereof, the single lower and upper outlets 11 and 12 of the fitting 7 being common to both sections or portions 9 and 10, but disposed in direct alignment with the section or portion 9, whereby to provide a straight passage upwardly through the same and through the lower and upper soil and vent pipe sections 6 and 8 from the sewer pipe 5, a relatively narrow slotway 13 being formed between the sections or portions 9 and 10 to provide a convenient means for the engagement therewith of the usual form of strap hangers (not shown) for the retaining and securing of the fitting in position.

In connecting the house devices, such as lavatories, bathtubs, sinks and the like, to the plumbing system, and as shown, a kitchen sink 14 located on the first floor *a* of the building or house, is to be connected by means of suitable pipe connections 15 to the vent pipe section or portion 10 of the fitting at a point above the floor level, while a bathtub 16 and a lavatory bowl 17, located on the second floor *b* of the building or house, is to be connected by suitable soil pipe connections 18 and 19 respectively, to the soil pipe section or portion 9 of the fitting, a vent pipe connection 20 being preferably taken from the bathtub soil pipe connection 18 and connected to the upper end of the vent pipe section or portion 10, and a similar vent pipe connection 21 is preferably extended between the sewer pipe 5 and the vent pipe section or portion 10 of the fitting 7, and connecting the latter at a point above the soil or waste pipe connection 15 of the house device or sink 14.

In the operation of the system thus provided, the construction and arrangement of the fitting 7, for the provision of separate soil and vent pipe sections or leg portions 9 and 10, assures of a more free discharge of the soil or waste from the several house devices connected thereto, since the lower of such devices may be connected to the vent pipe section or portion 10 and the upper of the devices directly to the soil pipe section or portion 9, and as a consequence thereof, a more free dissipation of the odors from the soil and waste will obtain in both the soil and vent pipe sections or portions 9 and 10, and be discharged upwardly of the upper vent pipe section 8 to atmosphere, also, by venting the sewer pipe 5, at a point adjacent the discharge therein of the soil pipe 6, and into the vent pipe section or portion 10 of the fitting 7, the sewer system, to which a number of plumbing systems are generally connected, will be kept comparatively free from odors such as are now known to exist in the same, and which are otherwise objectionable in their dissipation and discharge upward of the man-holes and street sewer traps in towns and cities.

It is to be here noted that the adjacent ends of the several sewer, soil and vent pipe sections and the fitting may be connected one to the other in any suitable or known manner, such as by means of threaded connections, or by caulking, as to assure of non-leakable connections being established and maintained therebetween.

From the foregoing, it will be readily apparent that, while a preferred embodiment of the system and the parts thereof, have been described and illustrated in specific terms and details of construction and arrangement herein, various changes in and modifications of the same may be resorted to without departing from the spirit of the invention, or the scope of the claim appended hereto.

Having thus fully described the invention, what is claimed, is:—

In a plumbing system, a sewer pipe connection, a combined soil and vent element of a length to extend from said sewer pipe connection through a series of rooms of a building and project above the roof of a building, an auxiliary combined soil and vent pipe section of a length as to extend in a series of rooms of the building and having its ends opening into and formed integral with said element at the upper and lower portions of the latter, said auxiliary section arranged parallel with and in close relation to said element, waste pipe connections leading to said element, a vent pipe leading from one of said connections to the upper portion of said pipe section, a vent pipe connection leading from said sewer pipe connection to said auxiliary section, and a waste pipe connection leading to said auxiliary section.

In testimony whereof, I affix my signature hereto.

PETER J. GARVIN.